United States Patent
Fischer et al.

(10) Patent No.: US 10,590,009 B2
(45) Date of Patent: Mar. 17, 2020

(54) APPARATUS AND METHOD FOR REACTIVE DISTILLATION FOR WASTE WATER TREATMENT

(71) Applicant: SHELL OIL COMPANY, Houston, TX (US)

(72) Inventors: Kai Jürgen Fischer, Amsterdam (NL); Matthias Behn, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 2 days.

(21) Appl. No.: 15/738,603

(22) PCT Filed: Jun. 23, 2016

(86) PCT No.: PCT/EP2016/064525
§ 371 (c)(1),
(2) Date: Dec. 21, 2017

(87) PCT Pub. No.: WO2016/207272
PCT Pub. Date: Dec. 29, 2016

(65) Prior Publication Data
US 2018/0194644 A1    Jul. 12, 2018

(30) Foreign Application Priority Data

Jun. 23, 2015   (EP) .................................... 15173311

(51) Int. Cl.
| | | |
|---|---|---|
| C02F 1/04 | (2006.01) | |
| B01D 3/00 | (2006.01) | |
| B01D 3/38 | (2006.01) | |
| B01D 3/14 | (2006.01) | |
| B01D 3/32 | (2006.01) | |
| B01D 5/00 | (2006.01) | |

(Continued)

(52) U.S. Cl.
CPC .............. *C02F 1/048* (2013.01); *B01D 3/009* (2013.01); *B01D 3/143* (2013.01); *B01D 3/32* (2013.01); *B01D 3/38* (2013.01); *B01D 5/0063* (2013.01); *C02F 1/725* (2013.01); *C02F 2101/30* (2013.01); *C02F 2103/365* (2013.01); *C02F 2201/002* (2013.01)

(58) Field of Classification Search
USPC ........................................ 203/28, 34, 87, 98
See application file for complete search history.

(56) References Cited

U.S. PATENT DOCUMENTS 5,648,529 A * 7/1997 Jones ..................... B01D 3/009
                                                    562/608
6,015,875 A    1/2000 Smith, Jr. et al.

FOREIGN PATENT DOCUMENTS

| CN | 101597117 A | 12/2009 |
|---|---|---|
| WO | 9948855 A1 | 9/1999 |

(Continued)

OTHER PUBLICATIONS

International Search Report and Written Opinion received for PCT Patent Application No. PCT/EP2016/064525, dated Aug. 17, 2016, 10 pages.

*Primary Examiner* — Thuan D Dang

(57) ABSTRACT

The present invention relates to a method for treating a waste water stream. Said waste water comprises hydrocarbons and oxygenates such as alcohols, aldehydes, ketones, carboxylic acids, and has a COD of up to 5 wt %. The invention relates to a distillation column for treating a waste water stream and a system for treating a waste water stream.

11 Claims, 1 Drawing Sheet

(51) Int. Cl.
*C02F 1/72* (2006.01)
*C02F 101/30* (2006.01)
*C02F 103/36* (2006.01)

(56) References Cited

FOREIGN PATENT DOCUMENTS

| WO | 03106349 A1 | 12/2003 |
|---|---|---|
| WO | 2012062822 A1 | 5/2012 |

* cited by examiner

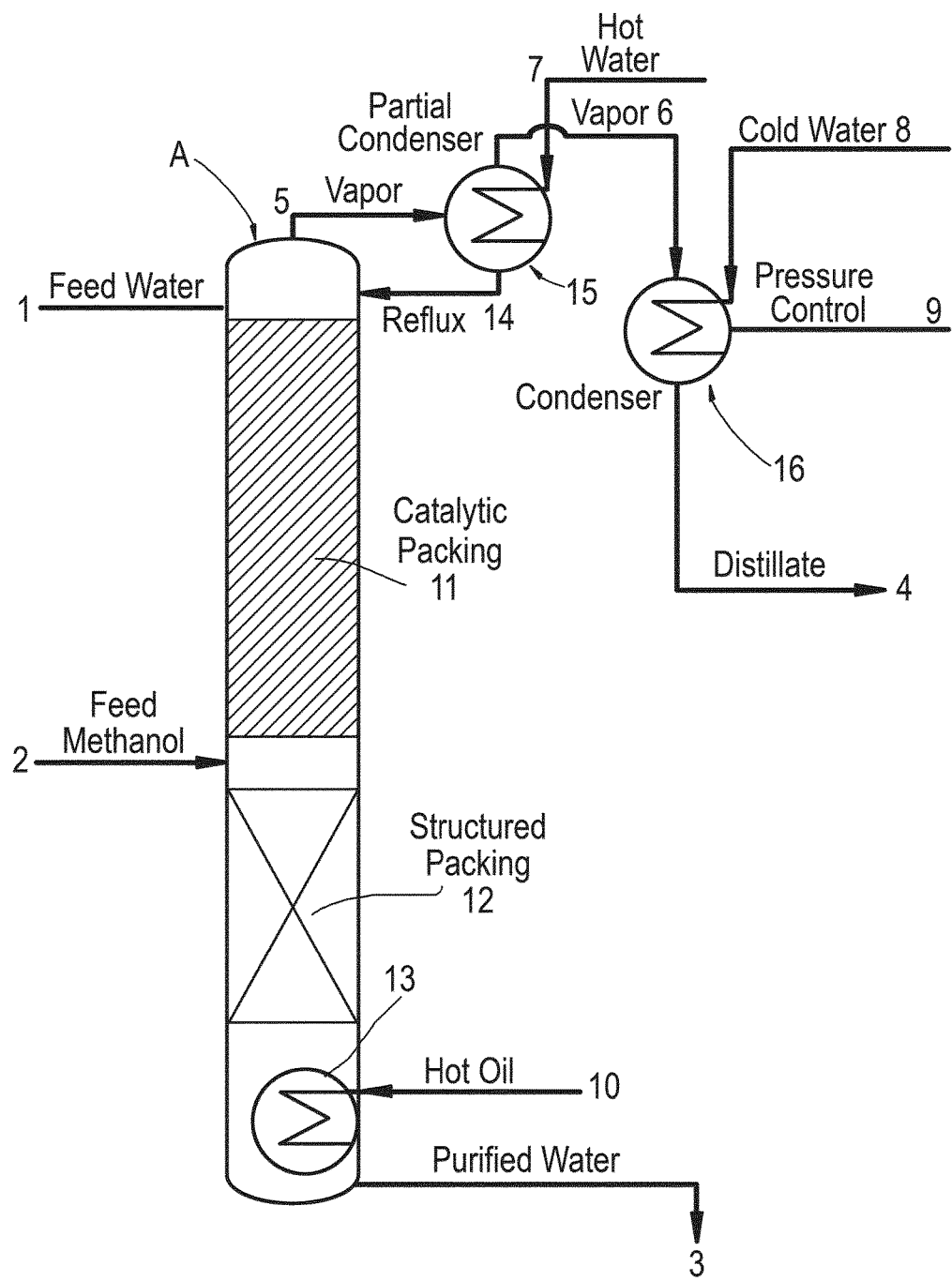

APPARATUS AND METHOD FOR REACTIVE DISTILLATION FOR WASTE WATER TREATMENT

PRIORITY CLAIM

The present application is the National Stage (§ 371) of International Application No. PCT/EP2016/064525, filed Jun. 23, 2016, which claims priority from 15173311.0, filed Jun. 23, 2015 incorporated herein by reference.

FIELD OF THE INVENTION

The present invention relates to a method for treating a waste water stream. Said waste water comprises hydrocarbons and oxygenates such as alcohols, aldehydes, ketones, carboxylic acids, and has a COD of up to 5 wt %.

The invention relates to a distillation column for treating a waste water stream and a system for treating waste water streams.

BACKGROUND TO THE INVENTION

Many waste water streams such as those generated by chemical plants, municipal waste and waste water plants, food manufacturing facilities, industrial factories, petroleum refineries and animal farms typically contain high concentrations of organic compounds that need to be removed from such waste streams in view of increasing environmental constraints. Such organic compounds include hydrocarbons, alcohols, aldehydes, ketones, carboxylic acids and other oxygenates. In environmental chemistry, the chemical oxygen demand (COD) test is commonly used to indirectly measure the amount of such organic compounds in water, whereby COD is expressed in milligrams per litre (mg/l) or parts per million weight (ppmwt).

The basis for the COD test is that nearly all organic compounds can be fully oxidized to carbon dioxide with a strong oxidizing agent under acidic conditions. The amount of oxygen required to oxidize an organic compound to carbon dioxide, ammonia, and water is given by:

COD=(C/FW)(RMO)(32)

Where:
C=Concentration of oxidizable compound in the sample,
FW=Formula weight of the oxidizable compound in the sample,
RMO=Ratio of the # of moles of oxygen to # of moles of oxidizable compound in their reaction to CO2, water, and ammonia.

The International Organization for Standardization describes a standard method for measuring chemical oxygen demand in ISO 6060.

Organic compounds that contribute to COD can be removed from waste water streams by means of physical, chemical and/or biological and biochemical processes. The COD load is important for biological processes since the COD load determines mainly the size and operating costs of the biotreater. An often used pretreatment process to remove COD contaminants from waste water streams is to subject the waste water streams to a distillation step in which the COD contaminants are stripped off water in a distillation column and separately recovered. Such distillation processes leave, however, much room for improvement in terms of separation efficiency, energy consumption and operation stability.

In particular light (C1-C2) carboxylic acids exhibit high solubility for water and leave a distillation column with the bottom product. Depending on the design of the unit the treated water also contains longer chain (C3-C6) carboxylic acids which are highly soluble in water.

The treated water leaving a conventional water distillation typically has a COD load of around 1200 ppmwt.

A process generating substantial amounts of water is the Fischer-Tropsch process. The Fischer-Tropsch process can be used for the conversion of synthesis gas into liquid and/or solid hydrocarbons. The synthesis gas may be obtained from hydrocarbonaceous feedstock in a process wherein the feedstock, e.g. natural gas, associated gas and/or coal-bed methane, heavy and/or residual oil fractions, coal, biomass, is converted in a first step into a mixture of hydrogen and carbon monoxide. This mixture is often referred to as synthesis gas or syngas. Synthesis gas is produced in the syngas manufacturing unit of a GTL plant.

The synthesis gas preferably comes from steam reforming and/or from the partial oxidation of natural gas, typically methane, or other heavier hydrocarbons possibly present in natural gas (e.g., ethane, propane, butane). In a steam reforming process, natural gas is generally mixed with steam in a saturator and is passed through a catalytic bed comprising a catalyst. Synthesis gas can also be derived from other production processes such as, for example, autothermal reforming or the process known as C.P.O. (Catalytic Partial Oxidation). In the latter process streams of high-purity oxygen or enriched air together with desulfurized natural gas and a catalyst are used, or from the gasification of coal or other carbonaceous products, with steam at a high temperature.

The obtained synthesis gas is fed into a reactor where it is converted in one or more steps over a suitable catalyst at elevated temperature and pressure into paraffinic compounds and water by Fischer-Tropsch process. The obtained paraffinic compounds range from methane to high molecular weight modules. The obtained high molecular weight modules can comprise up to 200 carbon atoms, or, under particular circumstances, even more carbon atoms. Numerous types of reactor systems have been developed for carrying out the Fischer-Tropsch reaction. For example, Fischer-Tropsch reactor systems include fixed bed reactors, especially multi-tubular fixed bed reactors, fluidized bed reactors, such as entrained fluidized bed reactors and fixed fluidized bed reactors, and slurry bed reactors such as three-phase slurry bubble columns and ebulated bed reactors.

In a Fischer-Tropsch (FT) process carbon monoxide and hydrogen (ingredients of syngas) are converted into hydrocarbons and water according to the following general reaction:

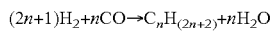

$$(2n+1)H_2 + nCO \rightarrow C_nH_{(2n+2)} + nH_2O$$

During the conversion of syngas into paraffinic compounds also water is formed. This water exits the FT reactor with the hydrocarbons and needs to be separated for further treatment as a waste water stream.

Next to the formation of hydrocarbons, organic molecules containing oxygen can be formed during the Fischer-Tropsch process. These compounds are referred to as oxygenated compounds or oxygenates. Oxygenates include alcohols, aldehydes, ketones and carboxylic (organic) acids. The oxygenates leave the FT reactor In GTL plants a substantial amount of water is produced which exits the FT reactor as a waste water stream. This waste water comprises trace metals and oxygenates. Due to the presence of trace metals and oxygenates the water requires treatment before it can be discharged. The required water treatment to remove the trace metals and oxygenates from the waste water stream requires elaborate and costly water treatment plants. These water treatment plants are also plot space intensive.

Further, in a GTL plant the COD load of the effluent water is important for the downstream effluent water treating plant and determines mainly the size and operating costs of the biotreater.

There remains a need for improved water treatment processes.

SUMMARY OF THE INVENTION

It is an object of the present invention to provide for an improved waste water treatment method. Preferably, the water treatment plant is also simplified and allows for direct discharge or reuse of the treated water. It is an object of the invention to reduce the COD load in the treated water.

It is an object of the present invention to provide a method capable to remove said oxygenated compounds or oxygenates by conversion from a highly diluted water stream together with other chemical oxygen demand (COD) generating contaminants via a continuous reactive distillation process. This enables deep COD removal and at the same time improves the energy efficiency.

It has now been found that by providing a distillation column with one or more catalytic sections which are provided with one or more acidic catalyst beds promoting esterification of organic acids and alcohols, and acetalization of aldehydes and ketalization of ketones and etherification of alcohols.

Accordingly, the present invention provides for a method for treating a waste water stream comprising hydrocarbons and oxygenates such as alcohols, aldehydes, ketones, carboxylic acids, and a COD of up to 5 wt % and preferably in the range of 1.6 wt % to 2.0 wt %. Said method comprising the following steps:

providing continuously said waste water to a distillation column comprising one or more catalytic sections, wherein the one or more catalytic sections are provided with one or more acidic catalyst beds promoting esterification of organic acids and alcohols, but also acetalization of aldehydes and ketalization of ketones and etherification of alcohols;

optionally, providing alcohol to the distillation column by:
(i) adding said alcohol to the water stream; and/or
(ii) providing said alcohol to the catalytic sections (between catalyst beds); and/or
(iii) providing said alcohol under the catalytic bed;

operating said distillation column at a temperature allowing the simultaneous conversion and separation of oxygenates at a pressure ranging from vacuum conditions up to maximally (syngas pressure) 40 bar;

withdrawing from the distillation column a distillate product in vapor and/or liquid form and a bottom product; wherein the bottom product has a COD in the range of up to 1000 ppmwt.

optionally withdrawing one or more liquid side draws from the column to perform phase splits including returning streams to the column The invention provides a distillation column for treating a waste water stream, comprising one or more catalytic sections, wherein the one or more catalytic sections are provided with one or more acidic catalyst beds promoting esterification of organic acids and alcohols and alcohols and acetalization of aldehydes and ketalization of ketones and etherification of alcohols.

The invention provides for a system for treating a waste water stream comprising one or more distillation columns.

It has surprisingly been found that by accommodating a reaction section with a catalytic bed in a distillation column the esterification of lower carboxylic acids and alcohol can be promoted even in highly diluted waste water system such as described. Esters are much more volatile than carboxylic acids and will rise in the column to the top. The reaction has a strong equilibrium limitation and can only be completed to full conversion when the product (esters) is removed from the reaction.

BRIEF DESCRIPTION OF THE DRAWING

FIG. 1 is a schematic drawing of a system used in Experiment 1.

DETAILED DESCRIPTION OF THE INVENTION

The present invention provides for a method for treating a waste water stream comprising hydrocarbons and oxygenates such as alcohols, aldehydes, ketones, carboxylic acids, and a COD of up to 5 wt % and preferably in the range of 1.6 wt % to 2.0 wt %. Weight percent (wt %) is based on the total weight of the waste water stream.

The method of the invention comprises the following steps:

providing continuously said waste water to one or more distillation column comprising one or more catalytic sections, wherein the one or more catalytic sections are provided with one or more acidic catalyst beds promoting esterification of organic acids and alcohols, but may also promote acetalization of aldehydes and ketalization of ketones and etherification of alcohols.

Utilizing an esterification reaction in a distillation column is for example disclosed in WO9948855. WO9948855 discloses a process for the synthesis of butylacetate by esterification of acetic acid with butanol by distillation accompanied by chemical reaction utilizing a column in which separation of the reaction products takes place together with the esterification in catalytically active separation equipment.

One of the ester formation reactions is the reaction between organic acids and alcohols. Esters are also formed by a number of other reactions utilizing acid anhydrides, acid chlorides, amides, nitriles, unsaturated hydrocarbons, ethers, aldehydes, ketones and alcohols. The reaction of esterification between organic acids and alcohols is a reversible reaction where esters and water are formed in the forward reaction (esterification). Reversible reaction is called hydrolysis reaction where water and ester react, producing corresponding alcohol and organic acid. The general esterification/hydrolysis reaction is given below:

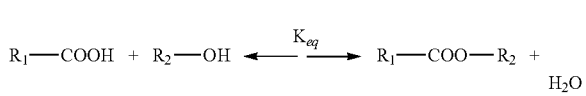

Combining reaction and distillation has several advantages, including:

a) shift of the chemical equilibrium to increase the chemical conversion by separation of the conversion products; the reaction products are continuously removed from the reaction mixture whereby chemical equilibrium cannot be established, resulting in high reaction rates.

b) suppression of side reactions; and c) utilization of the heat of reaction for the mass transfer operation. Hence the invention utilizes thermal separation of the different components present in the reaction mixture.

These effects associated with the invention result in significant economic benefits (such as lower capital investment, lower energy cost and higher product yields).

The inventors have found that the method of the present invention allows for the treatment of waste water having very low concentrations of oxygenates. For waste water treatment methods according to the prior art these concentrations are considered too low for an efficient removal. One reason for this is that the chemical equilibrium of ester formation is such that there is no driving force to convert carboxylic acids.

The method according to the invention may further comprise the step of providing alcohol to the distillation column by:

(i) adding said alcohol to the water stream; and/or (ii) providing said alcohol to the catalytic sections (between catalyst beds); and/or (iii) providing said alcohol under the catalytic bed.

In case the alcohol level of the waste water stream is low esterification of the carboxylic acids will be low too. In order to compensate for a low level of alcohols (compared to the carboxylic acids) alcohol can be added according to any one of steps (i)-(iii) in order to facilitate sufficient esterification of carboxylic acids.

The method of the present invention further comprises the step of operating the distillation column at a temperature allowing the simultaneous conversion and separation of oxygenates at a pressure ranging from vacuum conditions up to maximally 40 bar.

An aspect of the invention is a method for treating a waste water stream comprising hydrocarbons and oxygenates such as alcohols, aldehydes, ketones, carboxylic acids, and a COD of up to 5 wt % and preferably in the range of 1.6 wt % to 2.0 wt %, said method comprising the following steps:

providing continuously said waste water to a distillation column comprising one or more catalytic sections, such that the water is provided above the one or more catalytic sections;

wherein the one or more catalytic sections are provided with one or more acidic catalyst beds promoting esterification of organic acids and alcohols and acetalization of aldehydes and ketalization of ketones and etherification of alcohols;

providing alcohol to the distillation column in/or under the at least one catalytic section;

operating said distillation column at a temperature of at least 120° C. and at a pressure ranging from vacuum conditions up to maximally 40 bar, allowing the simultaneous conversion and separation of oxygenates;

withdrawing from the distillation column a distillate product in vapor and/or liquid form and a bottom product which consists substantially of water.

From the distillation column a distillate product, which can be in vapor and or in liquid form, and a bottom product are withdrawn, the bottom product has a COD in the range of up to 1000 ppmwt. Compared to the prior art treated water, the obtained water has a substantially lower COD. Due to this lower COD the obtained water can be reused in chemical processes as for example a cooling medium. Another application may be irrigation of the plant site. The inventors further found that with a method, system or column according to the present invention even lower concentrations can be obtained. The COD of the bottom product can be 100 ppmwt or less, and preferably 25 ppmwt or less and more preferably 20 ppmwt or less.

In an aspect of the invention the method further comprising the step of withdrawing one or more liquid streams at one or more withdrawal locations from the column to perform phase splits (e.g. three phase gas/liquid/liquid phase split) and reinjection of separated phases into the distillation column.

In an aspect of the invention the method comprises one or more of the following steps:

withdrawing an alcohol containing organic stream from the distillation column overhead condenser, said stream being provided to a three phase gas/liquid/liquid separator to recover alcohol from said stream, and providing said recovered alcohol to the distillation column according to any one or more of steps (i)-(iii);

reacting esters and other reaction products such as ethers, acetals and ketals from the organic stream back to alcohols and acids by adding water under catalytic conditions (hydrolysis) and subsequently recover alcohols by distillation for recycle into the reactive distillation column;

to reflux an aqueous phase, withdrawn from the three phase gas/liquid/liquid separator downstream the overhead condenser, to locations within the rectification and stripping section but preferably below the feed supply location. These steps allow for the efficient use of alcohol and water by obtaining alcohol from the overhead product stream. In an aspect of the invention a two phase separator can be used in place of a three phase separator.

In an aspect of the invention the acidic catalyst of the one or more catalytic beds is an acidic resin and may be a macroreticular sulfonated polystyrene-based ion-exchange resin. The esterification of carboxylic acids can be prompted through an acidic ion exchange resin (Amberlyst 15, for example). Amberlyst 15 is a macroreticular sulfonated polystyrene-based ion-exchange resin and is a mild and selective catalyst for methyl esterification of carboxylic acids. The inventors have found that this kind of catalysts provides for good results.

In an aspect of the invention:

Said waste water is provided above the one or more catalytic sections;

Said alcohol is provided to the distillation column in/or under the at least one catalytic section;

The distillation column is operated at a temperature of at least 120° C.

The inventors have found that the method according to the present invention comprising these steps provides for good results.

In an aspect of the present invention the waste water stream comprises waste water obtained from a Fischer-Tropsch synthesis unit such as a single or multi tubular fixed bed catalyst reactor, a slurry bed reactor or a microchannel Fischer-Tropsch reactor. In an aspect of the present invention the unit comprises at least one Fischer-Tropsch reactor which may be of the slurry bed type or of the fixed bed type. In an aspect the reactor comprises reactor tubes provided with catalytic fixed bed. With a fixed bed Fischer-tropsch reactor is meant a reactor comprising one or more reaction tubes filled with a catalyst. The catalyst is catalytically active in a Fischer-Tropsch reaction. The catalyst present in the fixed bed in the reactor, from which the waste water is obtained, preferably comprises a cobalt based catalyst and may further comprise promotors such as zirconium, titanium, chromium, vanadium and manganese. The catalyst particles may further comprise a carrier material. The catalyst carrier is preferably porous, such as a porous inorganic refractory oxide, more preferably alumina, silica, titania, zirconia or combinations thereof.

Also, rainwater or other service water present in the site can be added to the waste water stream coming from the Fischer-Tropsch reactor.

The present invention provides for a distillation column for treating a waste water stream, comprising one or more catalytic sections, wherein the one or more catalytic sections are provided with one or more acidic catalyst beds promoting esterification of organic acids and alcohols and alcohols, but also acetalization of aldehydes and ketalization of ketones and etherification of alcohols.

The distillation column may comprise a condenser at the head, a reboiler at the bottom, enrichment stages situated above the feeding and exhaustion stages situated below the feeding. Examples of suitable columns include plate type columns using a trays, such as a bubble-cap trays, a sieve trays, a valve trays, and a counterflow trays.

The catalytic sections in the column may be provided with various kinds of devices to house the catalyst.
1) Various kinds of packings to house the catalyst are available to accommodate the catalyst in gauze/mesh bags/boxes. An example of a packing is Sulzer's Katapak. Katapak is a structured packing in which catalyst granules are embedded.
2) Also tray kind of devices able to house gauze/mesh bags/boxes filled with catalyst particles may be provided.

The distillation column preferably operated at atmospheric pressure even if said column is capable of functioning equally well at pressures higher or lower than atmospheric pressure such as, for example, pressures ranging from 0.5 bara (bar absolute) to 4 bara (bar absolute). The temperatures are generally determined by the pressure and by the composition of the aqueous stream coming from the Fischer-Tropsch reaction. In general, at operating pressures ranging from 0.5 bara to 4 bara, the temperature at the head of the column is maintained within the range of from 70° C. to 125° C., that at the bottom within the range of from 90° C. to 160° C.

In an aspect of the invention the catalyst in the distillation column is an acidic catalyst. The catalyst may be a macroreticular sulfonated polystyrene-based ion-exchange resin as discussed previously.

In an aspect of the invention the distillation column comprises one or more of the catalytic sections located above a stripping section applied for alcohol recovery and/or within a rectification section for distillate enrichment.

In an aspect of the invention the column comprises one or more inlets for providing an alcohol containing liquid to the catalytic beds and/or underneath the catalytic section.

In an aspect of the invention the distillation column comprises one or more catalytic beds comprising structured elements and/or tray kind of devices providing (i) heat and mass transfer area/surface and (ii) holding packings filled with catalyst particles. The reaction is carried out using inserts on which or in which the catalyst is fixed. These inserts serve as a support structure for the gauze/mesh bags/boxes filled with catalyst. The inserts allow for good contact between the liquid and the gaseous phase and between the liquid and the catalyst. These column inserts can also have combinations of shapes.

Various kinds of packings to house the catalyst are available such as gauze/mesh bag/box shaped packings. An example of a packing is Sulzer's Katapak. Katapak is a structured packing in which catalyst granules are embedded.

The invention further relates to a system for treating a waste water stream comprising one or more distillation columns according to the present invention. In an aspect of the invention said system comprises two or more columns according to the invention in parallel to each other.

The system may comprise connected to the exit of the distillation column, (i) a one or two step condenser and reflux accumulator, including devices to perform three phase gas/liquid/liquid phase split, overhead system and (ii) a three phase gas/liquid/liquid phase split separator for column side draws.

The system according to the present invention may comprise upstream of the one or more distillation columns means of removing hydrocarbons from the waste water stream, preferably said means include gravity based separation or air floatation based separation.

In an aspect of the invention the method comprises the use of a distillation column or a system according to the present invention.

The invention will now be described by way of example only with reference to the accompanying drawing.

FIG. 1 depicts a system used in Experiment 1. The system depicted in FIG. 1 is a non-limiting embodiment of the invention. The system comprises a column A in which a catalytic packing 11 and structured packing 12 are housed. The structured packing is provided in the stripping section of the column. The column A is further provided with a heater 13 at the bottom part of the column. The heater 13 comprises an inlet through which hot oil 10 is provided.

In the upper part of the column waste water 1 is fed to the column A above or at the top of the catalytic packing 11. The water provided to the column moves down the column through the catalytic pack. Methanol is provided to the column A underneath the catalytic packing 11 via conduit 2. The methanol moves up the column A through the catalytic packing 11.

As the water moves down the column the acids (present in the waste water) meet the alcohols in a reactive environment which is the fixed bed catalyst inside the column packing. The reaction products obtained are removed the ester product from the chemical equilibrium limitation.

The system is further provided with a first a partial condenser 15 in which hot water at 112° C. is used producing the reflux of the column and a second condenser 16 with cold water to produce the distillate. Hot water is provided to the first condenser via conduit 7. The reflux 14 comprising methanol, is provided to the column A. Condenser 16 is provide with pressure control means 9.

The vapor obtained from condenser 15 is provided to the second condenser 16 in which the vapor is condensed obtaining the distillate. The distillate comprising the products of esterification of organic acids and alcohols and alcohols and acetalization of aldehydes and ketalization of ketones and etherification of alcohols.

The bottom of the column A is provided with an outlet through which purified water exits the column into conduit 3.

EXAMPLE

Experiment 1 (Invention)

A continuously operated distillation unit was used to treat a water stream containing COD contaminants.

The column with a diameter of 107 mm was made from stainless steel and equipped with structured packing, consisting of 1.6 meters Mellapak 752.Y (Sulzer) at the bottom and above 7.6 meters Katapak (Sulzer) with Amberlyst 48 catalyst supplied by DOW.

The COD contaminated water feed was placed at the top of the reactive section.

A second feed location for methanol injection was placed at the bottom of the reactive section.

The evaporator in the column bottom was a falling film evaporator with a surface of 0.4 square meters operated with heating oil.

The condenser consisted of a partial condensation by heat exchange with hot water which generated the reflux to the column and a condensation of the remaining vapor by heat exchange with cold water to condense the distillate. Total heat exchange area was 1.6 square meters.

Temperatures were measured at different locations of the unit. Feed stream and reflux flows were measured by flow meters and product stream flows were measured by scales.

Samples were taken from feed, reflux and product streams and analyzed for measuring the concentration of COD contaminants by gas chromatography with a flame ionization detector and liquid chromatography with a refractive index detector, both calibrated with standard samples.

Pressure was controlled at the top of the column behind the cold water condenser. FIG. 1 shows a schematic of the equipment used.

A water feed with the concentrations of COD contaminants according to Table 1, was prepared and homogenized by pump around circulation. In Table 1 the amounts in the column "synthetic" refer to the concentrations as calculated from the amounts of pure substances mixed together. The amounts in the column "analytic" were obtained by analyzing samples taken from the mixed feed. Discrepancies may originate from a small part of the feed molecules reacting over time, and from contamination of the pure substances.

TABLE 1

| Compound | synthetic concentrations | analytic (wt. ppm) |
|---|---|---|
| Methanol | 2291 | 2587 |
| Ethanol | 3204 | 3375 |
| Propanol | 1372 | 1295 |
| Butanol | 955 | 955 |
| Pentanol | 529 | 524 |
| Dimethylether | 0 | 11 |
| Methylethylether | 0 | 0 |
| Methylpropylether | 0 | 4 |
| Methylbutylether | 0 | 3 |
| 1,1-dimethoxymethaan | 0 | 9 |
| 1,1-dimethoxyethane | 0 | 9 |
| 1,1-dimethoxypropane | 0 | 4 |
| 1,1-methoxyethoxyethane | 0 | 0 |
| Aceetaldehyde | 93 | 99 |
| Propionaldehyde | 30 | n.a. |
| Formic acid | 263 | 250 |
| Acetic acid | 534 | 512 |
| Propionic acid | 162 | 168 |
| Butanoic acid | 217 | 208 |
| Pentanoic acid | 118 | 115 |
| Methylformate | 0 | 22 |
| Methylacetate | 0 | 27 |
| Ethylacetate | 0 | 5 |
| Methylpropanoate | 0 | 17 |
| Methylbutanoate | 0 | 13 |
| Methylpentanoate | 0 | 0 |

Traces of ethers, acetals and esters not fed quantified by feed analysis have formed by aging of the feed mixture over 3 weeks period of time.

This mixture was preheated to 105.3° C. and fed at a rate of 30.0 kg/hour to the column feed inlet above the catalytic section. Aqueous methanol (50 wt. % methanol in water) was fed at a rate of 1 kg/hour to the column feed inlet below the catalytic section. The top pressure was set to 2.78 bar.

The hot water partial condenser temperature was set to 98.00° C. The resulting distillate rate was 0.9 kg/h, the reflux rate was 20.3 kg/h, and the bottoms rate was 30 kg/h.

The temperature measured at the top of the column was 110.6° C., the temperature measured at the bottom of the column was 133.3° C.

Heating oil (Malotherm S with a specific heat capacity of 0.48 kcal/(kg° C.) was fed at 179° C. and cooled to 170° C. at a rate of 2.9 m$^3$/hour.

Hot water flow for partial condensation was 0.95 m$^3$/hour at 103° C. inlet and 98° C. outlet temperature.

The unit was operated for 15 hours, and the measured data provided herein were recorded at the end of the run where no changes were observed anymore and steady state is assumed.

The analytical results as listed in Table 2. are obtained for the bottom sample.

TABLE 2

| Compound | analytic concentrations wt. ppm |
|---|---|
| Formic acid | <0.5 |
| Acetic acid | 3 |
| Propionic acid | 1 |
| Butanoic acid | 4 |
| Pentanoic acid | <5 |

Other components were not found in the bottom sample.

GC-MS analysis of the distillate and reflux samples demonstrates that the organic acids have been converted to esters, where all products from combination of any alcohol with any acid have been found. The dominant species are methyl esters of the different acids. Furthermore, acetals were identified as reaction products from aldehydes and alcohols and ethers from combination of different alcohols. The catalyst shows activity for all these reactions.

While the invention has been described in terms of what are presently considered to be the most practical and preferred embodiments, it is to be understood that the disclosure need not be limited to the disclosed embodiments. It is intended to cover various modifications, combinations and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Any patents, publications, or other references mentioned in this application for patent are hereby incorporated by reference. In addition, as to each term used, it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans.

The appended claims form part of this description by way of this reference.

That which is claimed:

1. A method for treating a waste water comprising hydrocarbons and oxygenates including an organic acid and, optionally, an initial alcohol, and a COD of up to 5 wt %, said method comprising the following steps:

providing continuously said waste water to a distillation column comprising one or more catalytic sections, wherein when said waste water has an insufficient alcohol content, a supplemental alcohol is provided to the distillation column in a concentration sufficient to promote esterification of the organic acid, and wherein the one or more catalytic sections are provided with one or more acidic catalyst beds promoting esterification of the organic acid with the initial alcohol, the supplemental alcohol, or a combination thereof;

operating said distillation column at a temperature allowing simultaneous esterification of the organic acid and separation of unreacted oxygenates at a pressure ranging from vacuum conditions up to maximally (syngas pressure) 40 bar;

withdrawing from the distillation column a distillate product comprising esters produced by esterification of the organic acid in vapor and/or liquid form and a bottom product; wherein the bottom product has a COD in the range of up to 1000 ppmwt.

2. A method according to claim 1 wherein the bottom product has a COD of 100 ppmwt or less.

3. A method according to claim 1, further comprising the step of withdrawing one or more liquid streams at one or more withdrawal locations from the column to perform phase splits and reinjection of separated phases into the distillation column.

4. A method according to claim 3, further comprising the steps of:

reacting esters and other reaction products in the one or more liquid streams to alcohols and acids by adding water under catalytic hydrolysis conditions; and subsequently recovering alcohols by distillation for recycle into the distillation column.

5. A method according to claim 3, further comprising the steps of:

providing the one or more liquid streams to a three phase gas/liquid/liquid separator downstream from an overhead condenser of the distillation column;

withdrawing an aqueous phase from the three phase gas/liquid/liquid separator; and refluxing the aqueous phase to one or more locations within a rectification and stripping section of the distillation column.

6. A method according to claim 1, wherein the supplemental alcohol is provided to the distillation column by:

(i) adding the supplemental alcohol to the water stream; and/or (ii) providing the supplemental alcohol to the catalytic sections between catalyst beds; and/or (iii) providing the supplemental alcohol under the catalytic bed.

7. A method according claim 6, further comprising the steps of:

withdrawing an alcohol-containing organic stream from an overhead condenser of the distillation column;

providing said alcohol-containing organic stream to a three phase gas/liquid/liquid separator to recover alcohol from said alcohol-containing organic stream; and providing said recovered alcohol to the distillation column according to any one or more of steps (i)-(iii).

8. A method according to claim 1 wherein the acidic catalyst of the one or more catalytic beds is an acidic resin.

9. A method according to claim 1 wherein the waste water stream comprises waste water obtained from a Fischer-Tropsch synthesis unit.

10. A method according to claim 1 wherein
said waste water is provided above the one or more catalytic sections;

said alcohol is provided to the distillation column in/or under the at least one catalytic section; and the distillation column is operated at a temperature of at least 120° C.

11. A method according to claim 1, wherein the COD is in a range of from 1.6 wt % to 2.0 wt %.

* * * * *